3,453,120
PREPARING A STACKED SLICED FOOD PRODUCT
Floyd C. Olson and Everett V. Podebradsky, Madison, Wis., assignors to Oscar Mayer & Co., Inc., Chicago, Ill., a corporation of Illinois
No Drawing. Filed Dec. 13, 1965, Ser. No. 513,576
Int. Cl. A23b 1/10
U.S. Cl. 99—169                                    3 Claims

---

ABSTRACT OF THE DISCLOSURE

The confronting or contacting surfaces of stacked or shingled sliced food products, such as bacon, are treated with a solution of edible carrageenan selected from the group consisting of potassium carrageenan containing from about 80 to 90% kappa carrageenan and calcium carrageenan containing from about 80 to 90% kappa carrageenan, to prevent sticking.

---

This invention relates to innovations and improvements in stacked or shingled sliced food products wherein the slices are arranged in at least partial surface-to-surface relation and methods of preparing the same wherein the product slices have a tendency to cohere or stick together. Products of the type that are involved include sliced bacon, sliced ham and other meats sliced sausages or luncheon meats, sliced cheese, and various combinations of the foregoing such as ham and cheese slices. The tendency to cohere or stick together is normally increased at refrigerated temperatures.

In our prior Patent No. 3,141,779, dated July 21, 1964, we disclosed an invention wherein a deposit or coating of an alginate gel is formed in situ on one face of each pair of contacting faces so as to prevent undue cohering or sticking together. Our prior invention necessitates the use of a coating or deposit of alginate suspension and a separate alginate gel-forming substance, so as to form an alginate gel coating in situ. The required use of two components and the fact that care is required to form the alginate gel coating in situ uniformly and without too great an excess or deficiency of one of the reactants, induced us to look for additional improvements.

In addition to our above mentioned patented invention disclosed in Patent No. 3,141,779 there have been various proposals made to prevent sliced food products which are stacked or shingled in face-to-face contacting relation from sticking together so strongly so as to make separation difficult and often result in tearing or pulling apart of individual slices or pieces.

In accordance with the present invention we have found that excellent results are obtained by using as a release agent or anti-sticking or anti-cohering agent carrageenans which have good gelling properties. More specifically we use kappa carrageenans in the presence of potassium ions, or potassium and calcium ions. Thus carrageenans of 80–90% by weight kappa carrageenan content in which the cations associated with the sulphate group are mostly potassium, or potassium and calcium are most effective.

The preferred material is potassium carrageenan containing from about 80 to about 90% kappa carrageenan which is readily soluble in hot water in useful concentrations. The content of potassium, or potassium and calcium does not appear to be highly critical so long as there are sufficient potassium, or potassium and calcium ions, to cause gelling. These materials are obtainable commercially in edible or food grade purity at an economical cost.

Carrageenans with low gelling properties such as kappa carrageenans of sodium salts, or lambda carrageenan fractions of potassium, calcium and sodium salts, are much less effective for this purpose especially when a primary aim is also the use of a minimum amount of anti-sticking agent.

The object of the present invention, generally stated, is the use of kappa-carrageenan gels formed in the presence of potassium, or potassium and calcium, ions to prevent stacked or shingled slices of various food products of the class described from sticking together or cohering to an objectionable degree.

The use of such gels that are high in kappa carrageenan is not only preferable and more convenient and economical than the in situ formation of a gelatinous alginate gel is disclosed in our Patent No. 3,141,779, but also is preferable to other release agents or anti-sticking agents that have been used such as methyl cellulose, acetylated monoglycerides, Irish moss extracted solutions, corn oil, finely ground salt, finely ground sucrose and lactose, as well as mechanical aids such as interleafing paper strips.

Certain other objects of the invention will, in part, be obvious and will in part appear hereinafter.

While various commercially available carrageenan gel-forming products have been tried the one that has been found to function most satisfactorily is potassium carrageenan containing 80–90% kappa carrageenan. Food grade potassium carrageenan containing 80–90% kappa carrageenan is commercially available under the trademark "Gelcarin HWG." This material is soluble in hot water and it is preferably used in that condition. We have found that solutions ranging in concentrations from 0.2% to 2% are useful under varying conditions. However, concentrations of about .75% to 1.25% were the best.

We have also ascertained that potassium carrageenan solutions (about 80 to 90% kappa carrageenan) should be applied to at least one face of a slice to be stacked or shingled in a range from as little as 20 grams per square meter of surface up to 120 grams per square meter of surface when using solution concentrations in the range of 0.2% to 2%. Concentrations of about 1% applied at the rate of 40 to 75 grams per square meter of surface are the most desirable.

Calcium carrageenan (wherein the cations associated with the sulfate group are predominantly calcium but also including potassium and sodium) containing a high percentage of kappa carrageenan may also be employed for slice separation. Since calcium carrageenan forms a weaker gel than potassium carrageenan it is desirable to use it at higher concentrations and larger quantities than potassium carrageenan. Concentrations from 0.2% to 2% or more may be used in quantities from 20 grams to 120 grams per square meter of surface. Concentrations of about 1.5% applied at the rate of 40 to 100 grams per square meter of surface are desirable. Food grade calcium carrageenan of adequate kappa carrageenan content is available under the trademark "Gelcarin SI."

The solutions of potassium and/or calcium carrageenan may be applied in any suitable manner such as by spraying, roller coating, brush coating, dipping, etc.

In the amounts or concentrations used in the deposited potassium and/or calcium carrageenan are not noticeable insofar as appearance, odor or taste of the product are concerned. They do materially facilitate separation of food slices when used in the manner and concentrations indicated, and in this respect their presence is noticeable.

The following examples will serve to further make known and illustrate the invention:

Example I

Potassium carrageenan of 80 to 90% kappa carrageenan content (Gelcarin HWG) is dissolved in water at a temperature of approximately 165° F. to form a complete thin solution of about 1% concentration, which is readily sprayable. This solution is then sprayed on one side of each slice of a cured and smoked bacon belly as the same is being automatically sliced in known manner. The spray is adjusted so that the amount of solution deposited on the sprayed surface is from about 40 to 75 grams per square meter of surface. The bacon slices are shingled in the usual manner and then the sliced bacon products is refrigerated to a temperature of about 35° F. The slices separate readily without tearing, in contrast to controls of sliced and shingled bacon that has not been sprayed.

Example II

Example I is repeated but the shingled bacon is vacuum packaged in flexible packaging material so that the slices are pressed firmly together as a result of evacuation. After storage at 35° F. the slices of the evacuated packages can be readily separated in the packages where they have been treated with the potassium carrageenan. Slice separation is difficult and substantial tearing occurs with controls which have not been treated.

Example III

Calcium carrageenan of 80–90% kappa carrageenan content (Gelcarin SI) is dissolved in water at a temperature of about 165° F. to form a solution of approximately 1.5% concentration which is sprayable. This solution is then sprayed on one side of each slice of a cured and smoked bacon belly. The spray is adjusted so that the amount of solution deposited on the sprayed surface is 40 to 100 grams per square meter of surface. The bacon slices are shingled in the usual manner and then the sliced bacon products are refrigerated to a temperature of about 35° F. The slices separate readily without tearing, in contrast to controls of sliced shingled bacon that has not been sprayed.

In a similar manner slices of bologna, cheese, ham, liver sausage, etc., may be treated to prevent sticking or cohesion.

Since certain changes and variations may be made in practicing the invention without departing from the spirit and scope thereof, only such limitations should be imposed as are indicated in the appended claims.

What is claimed as new is:

1. The improvement in preparing a food product formed from product slices which normally cohere and arranged in at least partial surface-to-surface relation which comprises, depositing a sufficient quantity of a solution of an edible carrageenan selected from the group consisting of potassium carrageenan containing at least about 80% kappa carrageenan and calcium carrageenan containing at least about 80% kappa carrageenan on at least one face of each product slice so as to provide ready separation of said product slices.

2. The improvement in preparing a food product formed from product slices which normally cohere and arranged in at least partial surface-to-surface relation which comprises, depositing on at least one surface of each product slice at least 20 grams per square meter of a solution containing at least 0.2% by weight of an edible carrageenan selected from the group consisting of potassium carrageenan containing from about 80 to 90% kappa carrageenan and calcium carrageenan containing from about 80 to 90% kappa carrageenan.

3. The improvement called for in claim 2 wherein said food product is sliced bacon.

References Cited

UNITED STATES PATENTS

| 2,803,214 | 8/1957 | Hensgen | 99—169 X |
| 2,927,029 | 3/1960 | Long | 99—169 X |
| 3,141,779 | 7/1964 | Podebradsky et al. | 99—169 X |
| 3,241,982 | 3/1966 | Shank | 99—169 |

OTHER REFERENCES

Whistler: "Industrial Gums," 1959, published by Academic Press, New York, pp. 93, 94, 95, 97, 98, 100, 101, 102, 103, 106, 107, 112, and 113.

HYMAN LORD, *Primary Examiner.*

U.S. Cl. X.R.

99—166